(12) United States Patent
Wu

(10) Patent No.: US 10,778,604 B2
(45) Date of Patent: Sep. 15, 2020

(54) LOCATION DATA PROCESSING METHOD, APPARATUS AND SYSTEM

(71) Applicant: ZTE CORPORATION, Shenzhen, Guangdong (CN)

(72) Inventor: Hao Wu, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 416 days.

(21) Appl. No.: 15/573,958

(22) PCT Filed: Dec. 21, 2015

(86) PCT No.: PCT/CN2015/098088
§ 371 (c)(1),
(2) Date: Nov. 14, 2017

(87) PCT Pub. No.: WO2016/184098
PCT Pub. Date: Nov. 24, 2016

(65) Prior Publication Data
US 2018/0295068 A1 Oct. 11, 2018

(30) Foreign Application Priority Data

May 15, 2015 (CN) .......................... 2015 1 0249566

(51) Int. Cl.
*G06F 15/173* (2006.01)
*H04L 12/927* (2013.01)
(Continued)

(52) U.S. Cl.
CPC .............. *H04L 47/80* (2013.01); *H04L 29/12* (2013.01); *H04L 67/18* (2013.01); *H04L 69/40* (2013.01); *H04W 4/02* (2013.01); *H04W 4/70* (2018.02)

(58) Field of Classification Search
CPC ......... H04L 47/80; H04L 29/12; H04L 67/18; H04L 69/40; H04W 4/70; H04W 4/02
(Continued)

(56) References Cited

U.S. PATENT DOCUMENTS 9,215,551 B2  12/2015  Yang
2004/0172390 A1  9/2004  Srivastava et al.
(Continued)

FOREIGN PATENT DOCUMENTS

CN   104093118 A   10/2014
CN   104602180 A   5/2015

OTHER PUBLICATIONS

International Search Report dated Mar. 14, 2016 for International Application No. PCT/CN2015/098088, 5 pages.
(Continued)

*Primary Examiner* — Philip B Tran
(74) *Attorney, Agent, or Firm* — Knobbe, Martens, Olson & Bear, LLP

(57) ABSTRACT

The present disclosure provides a location data processing method, apparatus and system. In the method, after a common service entity (CSE) detects that a container resource of a location management resource corresponding to received location data fails to be established, the container resource corresponding to the location data is re-established, which solves the problem that the location data often fails to be stored in a register CSE, and improves the fluency of user positioning.

11 Claims, 3 Drawing Sheets

(51) Int. Cl.
*H04L 29/12* (2006.01)
*H04W 4/70* (2018.01)
*H04W 4/02* (2018.01)
*H04L 29/14* (2006.01)
*H04L 29/08* (2006.01)

(58) Field of Classification Search
USPC .......................................... 709/226, 223–224
See application file for complete search history.

(56) References Cited

U.S. PATENT DOCUMENTS

| | | | |
|---|---|---|---|
| 2014/0215176 A1 | 7/2014 | Iga | |
| 2014/0221032 A1 | 8/2014 | Yang | |
| 2016/0112981 A1* | 4/2016 | Ahn et al. | H04W 64/00 |
| 2017/0257726 A1* | 9/2017 | Jeong et al. | H04W 4/005 |
| 2017/0311303 A1* | 10/2017 | Ahn et al. | H04W 72/0406 |

OTHER PUBLICATIONS

Extended European Search Report of corresponding European Patent Application No. 15892472.0—14 pages (dated Jan. 4, 2019).
"Bug #1160052, Need a way to retry failed operations", Orchestration API (Heat), retrieved from <https://web.archive.org/web/20140411011031/https://bugs.launchpad.net/heat/+bug/1160052>—7 pages (Apr. 11, 2014).
LG Electronics, "<locationPolicy>Resource-Type Specific Procedures", ONEM2M—6 pages (Jun. 1, 2014).
Bhalla et al, "Functional Architecture", ONEM2M Technical Specification—325 pages (Apr. 9, 2015).
Office Action of corresponding Chinese Patent Application No. 201510249566.2—10 pages (dated Mar. 2, 2020).
"ONEM2M Functional Architecture Baseline Draft", ONEM2M Technical Specification—13 pages (Aug. 1, 2014).

* cited by examiner

LOCATION DATA PROCESSING METHOD, APPARATUS AND SYSTEM

CROSS REFERENCE TO RELATED APPLICATIONS

This application is the U.S. National Phase Application under 35 U.S.C. § 371 of International Application No. PCT/CN2015/098088, filed Dec. 21, 2015, designating the U.S. and published as WO 2016/184098 A1 on Nov. 24, 2016 which claims the benefit of Chinese Patent Application No. 201510249566.2, filed May 15, 2015, both of which are hereby incorporated by reference in their entirety.

TECHNICAL FIELD

The present disclosure relates to the field of communication, and specifically to a location data processing method, apparatus and system.

BACKGROUND

According to the architecture specification of Machine-To-Machine (M2M) in related art, when a resource of a designated type has been established successfully, a success message is responded to an initiator. However, in the special case where a "location management" resource is established, the resource of "container" type required to be established synchronously by the register CSE possibly fails to be established, for example, because of insufficient storage space at that time. In this case, the location data of a specific node acquired from a location server has nowhere to be stored.

An M2M communication network consists of various M2M nodes and a bear-network. M2M nodes, served as physical devices, achieve M2M services by means of the communication among the logical units therein. One M2M node includes an Application Entity or a Common Service Entity. The Application Entity (AE) is a logical unit for implementing actual M2M applications. The Common Service Entity (CSE) is a logical unit for managing the AE and the M2M node and providing serving for the AE.

An AE needs to register on a CSE to be served by the CSE. For example, the CSE, here known as a register CSE of the AE, sends data to another AE or CSE. Moreover, since various CSEs can provide different services, one CSE may register on another CSE to be served by said another CSE, which is also known as a register CSE for the former CSE.

An AE or CSE at any node can send a request to its register CSE for requesting location information of a specific M2M node. The register CSE can obtain the location information of nodes from network.

The AE or CSE sends a request for establishing a "location management" resource to the register CSE. The "Location management" refers to a type of resource, which contains a series of parameters related to obtaining of location information, e.g., an identification of the node whose location information needs to be obtained, a period for obtaining location information, and so on. Then, the AE or CSE establishes a "target node identification" attribute in the "location management" resource to store the identification of the node whose location information needs to be obtained. When the "location management" resource is established, the register CSE synchronously establishes a "container" type resource for storing the obtained location information data. At the same time, a "location container" attribute is established in the "location management" resource for storing the address of the "container" type resource, thereby associating the "location management" resource with the "container" resource.

According to the existing architecture specification of M2M, when a resource of a designated type has been established successfully, a success message is responded to an initiator. However, in the special case where a "location management" resource is established, the resource of "container" type required to be established synchronously by the register CSE possibly fails to be established. In the process of the related art, the registered CSE will not inform whether the "container" resource has been established successfully to the AE or CSE which initiates to establish the resource. Moreover, once the "container" resource fails to be established, there is no subsequent operation to maintain the establishment of the "container" resource. In this case, even if storage space has been available after the location data of a designed node is obtain from a location server, it is possible that the location data have nowhere to be stored.

At present, no effective solutions are proposed to solve the problem in the related art that the location data often fails to be stored in a register CSE.

SUMMARY

The present disclosure provides a location data processing method, apparatus and system, so as to solve at least the problem in the related art that the location data often fails to be stored in a register CSE.

An aspect of the present disclosure provides a location data processing method, which includes: after detecting, by a Common Service Entity (CSE), that a container resource of a location management resource corresponding to received location data fails to be established, re-establishing, by the CSE, the container resource corresponding to the received location data.

In embodiments of the present disclosure, the detecting, by the CSE, that the container resource of the location management resource corresponding to the received location data fails to be established includes: detecting an absence of a location container attribute in the location management resource; or detecting a null value of the container resource for the location container attribute.

In embodiments of the present disclosure, the re-establishing the container resource includes: establishing the container resource, establishing a location container attribute in the location management resource, and setting a value of the location container attribute as an address of the container resource; or establishing the container resource, and setting a value of the location container attribute as an address of the container resource.

In embodiments of the present disclosure, before detecting, by the CSE, the container resource of the location management resource corresponding to the received location data fails to be established, the method further includes: detecting whether the CSE conforms to a preset establishment strategy.

In embodiments of the present disclosure, the detecting whether the CSE conforms to a preset establishment strategy includes at least one of the following: counting time from a last failure of the CSE in establishing the container resource, and detecting whether the counted time reaches a preset duration; detecting whether the location data sent from a location server is received by the CSE; and detecting whether the number of times that the CSE establishes the container resource within a preset statistic period reaches a preset number of establishment times.

In embodiments of the present disclosure, the method includes: discarding the location data when the CSE does not conform to the preset establishment strategy.

Another aspect of the present disclosure further provides a location data processing apparatus, which includes a detection module and a first establishment module.

The detection module is configured to detect, by a Common Service Entity (CSE), whether a container resource of a location management resource corresponding to received location data fails to be established.

The first establishment module is configured to re-establish the container resource corresponding to the location data when the container resource fails to be established.

In embodiments of the present disclosure, the detection, by the CSE, that the container resource of the location management resource corresponding to the received location data fails to be established includes: detection of an absence of a location container attribute in the location management resource; or detection of a null value of the container resource for the location container attribute.

In embodiments of the present disclosure, the first establishment module includes a first setting unit and a second setting unit.

The first setting unit is configured to establish the container resource, establish a location container attribute in the location management resource and set a value of the location container attribute as an address of the container resource.

The second setting unit is configured to establish the container resource and set the value of the location container attribute as the address of the container resource.

In embodiments of the present disclosure, the apparatus further includes a strategy module and a second establishment module.

The strategy module is configured to detect whether the CSE conforms to a preset establishment strategy.

The second establishment module is configured to, when the CSE conforms to the preset establishment strategy, re-establish the container resource corresponding to the location data.

In embodiments of the present disclosure, the strategy module includes a timing unit, receiving unit, and a times unit.

The timing unit is configured to count time from a last failure of the CSE in establishing the container resource and detect whether the counted time reaches a preset duration.

The receiving unit is configured to detect whether the location data sent from a location server is received by the CSE.

The times unit is configured to detect whether the number of times that the CSE establishes the container resource within a preset statistic period reaches a preset number of establishment times.

In embodiments of the present disclosure, the apparatus further includes: a discard module configured to discard the location data when the CSE does not conform to the preset establishment strategy.

A further aspect of the present disclosure provides a location data processing system, including a Common Service Entity (CSE) and a location server. The CSE receives location data sent from the location server. The CSE detects whether a container resource of a location management resource corresponding to the location data fails to be established. The CSE re-establishes a container resource corresponding to the location data when the container resource fails to be established.

In embodiments of the present disclosure, after the CSE detects that a container resource of a location management resource corresponding to received location data fails to be established, the CSE re-establishes the container resource corresponding to the location data, which solves the problem that the location data often fails to be stored in a register CSE and improves the fluency of user positioning.

BRIEF DESCRIPTION OF DRAWINGS

The accompanying drawings are described herein to provide further understanding of the present disclosure and constitute a part of the present application. The exemplary embodiments of the present disclosure and their descriptions are to explain the present disclosure and do not constitute inappropriate limitations to the present disclosure.

DETAILED DESCRIPTION

Embodiments of the present disclosure will be described below with reference to the accompanying drawings. If not conflicted, the embodiments herein and the features thereof may be combined with each other.

It is noted that the terms "first", "second" and the like in description, claims and above accompanying drawings of the present disclosure are used to differentiate similar objects, and not necessary to describe a certain order or sequence.

Figure 1:
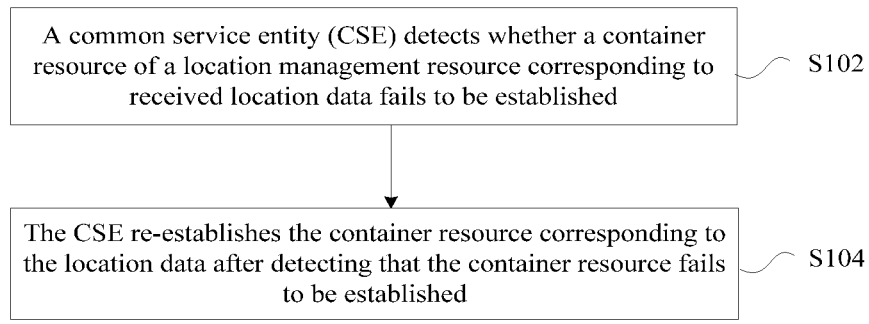
FIG. 1 is a first flowchart of a location data processing method according to an embodiment of the present disclosure.

This embodiment provides a location data processing method. FIG. 1 is a first flowchart of a location data processing method according to an embodiment of the present disclosure. The process illustrated in FIG. 1 includes steps described below.

In step S102, a Common Service Entity (CSE) detects whether a container resource of a location management resource corresponding to received location data fails to be established.

In step S104, the container resource corresponding to the location data is re-established after it is detected that that the container resource fails to be established.

With the steps described above, after the CSE detects that a container resource of a location management resource corresponding to received location data fails to be established, the CSE re-establishes the container resource corresponding to the location data, which solves the problem that the location data often fails to be stored in a register CSE, and improves the fluency of user positioning.

In this embodiment, there may be various cases in which the CSE detects that the container resource of the location management resource corresponding to the received location data fails to be established. For example, it may be the limited storage space corresponding to the location data, which causes the failure in establishment of container resource. The detection may include detecting the location container attribute in the location management resource, or detecting whether an address corresponding to the container resource for the location container attribute has a null value. In the case that an absence of the location container attribute in the location management resource is detected or a null value of the container resource for the location container attribute is detected, the container resource of the location management resource corresponding to the location data fails to be established.

In this embodiment, the re-establishing the container resource may include: establishing the container resource, establishing a location container attribute in the location management resource, and setting the value of the location container attribute as the address of the container resource; or establishing the container resource, and setting the value of the location container attribute as the address of the container resource.

Figure 2:
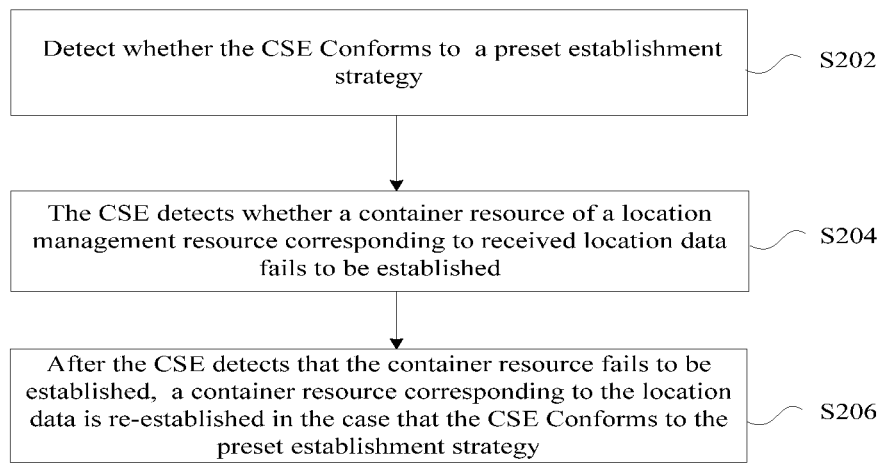
FIG. 2 is a second flowchart of a location data processing method according to an embodiment of the present disclosure.

This embodiment further provides a location data processing method. FIG. 2 is a second flowchart of a location data processing method according to an embodiment of the present disclosure. The process illustrated in FIG. 2 includes steps described below.

In step S202, whether the CSE conforms to a preset establishment strategy is detected.

In step S204, the CSE detects whether a container resource of a location management resource corresponding to received location data fails to be established.

In step S206, after the CSE detects that the container resource fails to be established, a container resource corresponding to the location data is re-established in the case that the CSE conforms to the preset establishment strategy is detected.

With the steps described above, before the CSE detects that a container resource of a location management resource corresponding to received location data fails to be established, whether the CSE conforms to the corresponding preset establishment strategy is detected; when the CSE conforms to the corresponding preset establishment strategy, the CSE re-establishes a container resource corresponding to the location data, solving the problem that the location data often fails to be stored in the register CSE, and improving the fluency of user positioning.

In this embodiment, there may be various preset establishment strategies. For example, detecting whether the CSE conforms to the preset establishment strategy may include: counting time from the last failure of the CSE in establishing the container resource, and detecting whether the counted time reaches a preset duration; detecting whether the location data sent from a location server is received by the CSE; detecting whether the number of times that the CSE establishes the container resource within a preset statistic period reaches a preset number of establishment times.

In this embodiment, the location data are discarded when the CSE does not conform to the preset establishment strategy.

This embodiment further provides a location data processing apparatus, which is located in a terminal. The apparatus is configured to implement the above embodiments and preferred implementations. Those have already been described will not be described here. The term "module", which will be used hereafter, can be a combination of software and/or hardware for achieving a predetermined function. While the apparatus described in the embodiment below is preferably implemented in software, implementations in hardware or a combination of software and hardware are also possible and contemplated.

Figure 3:
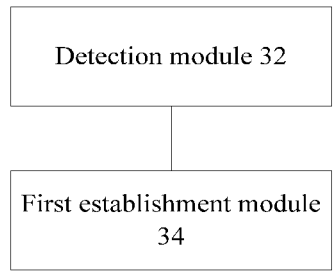
FIG. 3 is a first structure block diagram of a location data processing apparatus according to an embodiment of the present disclosure.

FIG. 3 is a first structure block diagram of a location data processing apparatus according to an embodiment of the present disclosure. The apparatus illustrated in FIG. 3 includes a detection module 32 and a first establishment module 34.

The detection module 32 is configured to detect, by a CSE, whether a container resource of a location management resource corresponding to received location data fails to be established.

The first establishment module 34 is configured to re-establish a container resource corresponding to the location data when the container resource fails to be established.

With the apparatus described above, after the CSE detects that a container resource of a location management resource corresponding to received location data fails to be established, the CSE re-establishes the container resource corresponding to the location data, which solves the problem that the location data often fails to be stored in a register CSE, and improves the fluency of user positioning.

In this embodiment, the detection, by the CSE, that a container resource of a location management resource corresponding to the received location data fails to be established includes: detection of an absence of a location container attribute in the location management resource; or detection of a null value of the container resource for the location container attribute.

In this embodiment, the first establishment module 34 includes a first setting unit and a second setting unit.

The first setting unit is configured to establish the container resource, establish a location container attribute in the location management resource and set the value of the location container attribute as the address of the container resource.

The second setting unit is configured to establish the container resource and set the value of the location container attribute as the address of the container resource.

Figure 4:
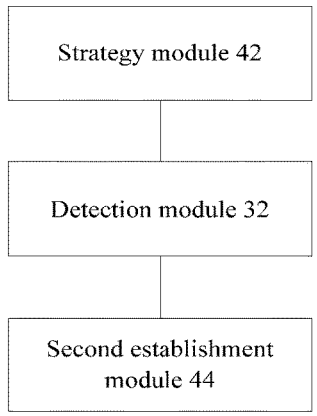
FIG. 4 is a second structure block diagram of a location data processing apparatus according to an embodiment of the present disclosure.

FIG. 4 is a second structure block diagram of a location data processing apparatus according to an embodiment of the present disclosure. The apparatus illustrated in FIG. 4, in addition to the detection module 32 in FIG. 3, further includes a strategy module 42 and a second establishment module 44.

The strategy module 42 is configured to detect whether the CSE conforms to a preset establishment strategy;

The second establishment module 44 is configured to re-establish a container resource corresponding to the location data when the CSE conforms to the preset establishment.

With the apparatus described above, after the CSE detects that a container resource of a location management resource corresponding to received location data fails to be established and when the CSE conforms to the corresponding preset establishment strategy, the CSE re-establishes a container resource corresponding to the location data, which solves the problem that the location data often fails to be stored in a register CSE, and improves the fluency of user positioning.

In above embodiment, the first establishment module 34 and the second establishment module 44 may be configured to establish a location container attribute corresponding to the container resource in the location management resource and set a value for the location container attribute corresponding to the container resource.

In this embodiment, the strategy module 42 includes a timing unit, a times unit and a times unit.

The timing unit is configured to count time from the last failure of the CSE in establishing the container resource and detect whether the counted time reaches a preset duration.

The receiving unit is configured to detect whether the location data sent from a location server is received by the CSE.

The times unit is configured to detect whether the number of times that the CSE establishes the container resource within a preset statistic period reaches a preset number of establishment times.

In this embodiment, the apparatus further includes: a discard module configured to discard the location data when the CSE does not conform to the preset establishment strategy.

This embodiment further provides a location data processing system, which includes a CSE and a location server.

The CSE receives location data sent from the location server.

The CSE detects whether a container resource of a location management resource corresponding to the location data fails to be established.

The CSE re-establishes a container resource corresponding to the location data when the container resource fails to be established.

The present disclosure will be described below in detail in combination with preferred embodiments and preferred implementations.

The preferred embodiment provides a mechanism enabling the register CSE to detect and re-establish a "container" resource. After a "location management" resource is successfully established, the "container" can be re-established in a various of manners if necessary. For example, the register CSE is set to re-establish 5 minutes after the last failure in establishment, or the register CSE is triggered to establish the resource when a certain event occurs. The preferred embodiment is performed in a manner of event triggering, e.g., at a time when a location server sends location data to the register CSE.

Figure 5:
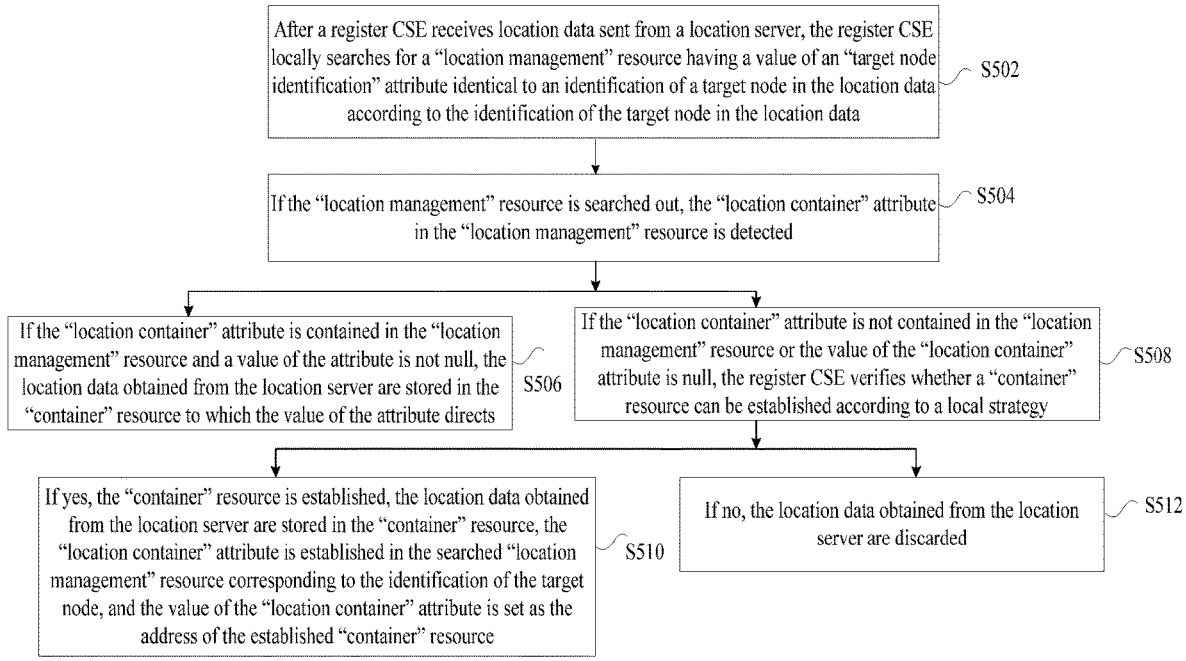
FIG. 5 is a first flowchart of a method of establishing container resource for location data according to a preferred embodiment of the present disclosure.

FIG. 5 is a first flowchart of a method for establishing container resource for location data according to a preferred embodiment of the present disclosure. The method illustrated in FIG. 5 includes steps described below.

In step S502, after a register CSE receives location data sent from a location server, the register CSE locally searches for a "location management" resource having a value of an "target node identification" attribute identical to an identification of a target node in the location data according to the identification of the target node in the location data.

In step S504, if the "location management" resource is searched out, the "location container" attribute in the "location management" resource is detected.

In step S506, if the "location container" attribute is contained in the "location management" resource and a value of the "location container" attribute is not null, the location data obtained from the location server are stored in the "container" resource to which the value of the "location container" attribute directs.

In step S508, if the "location container" attribute is not contained in the "location management" resource or the "location container" attribute is contained in the "location management" resource but the value of the "location container" attribute is null, the register CSE verifies whether a "container" resource can be established according to a local strategy.

In step S510, if the "container" resource can be established, the "container" resource is established, the location data obtained from the location server are stored in the "container" resource, the "location container" attribute is established in the searched "location management" resource corresponding to the identification of the target node, and the value of the "location container" attribute is set as the address of the established "container" resource.

In step S512, if the "container" resource cannot be established, the location data obtained from the location server are discarded.

Figure 6:
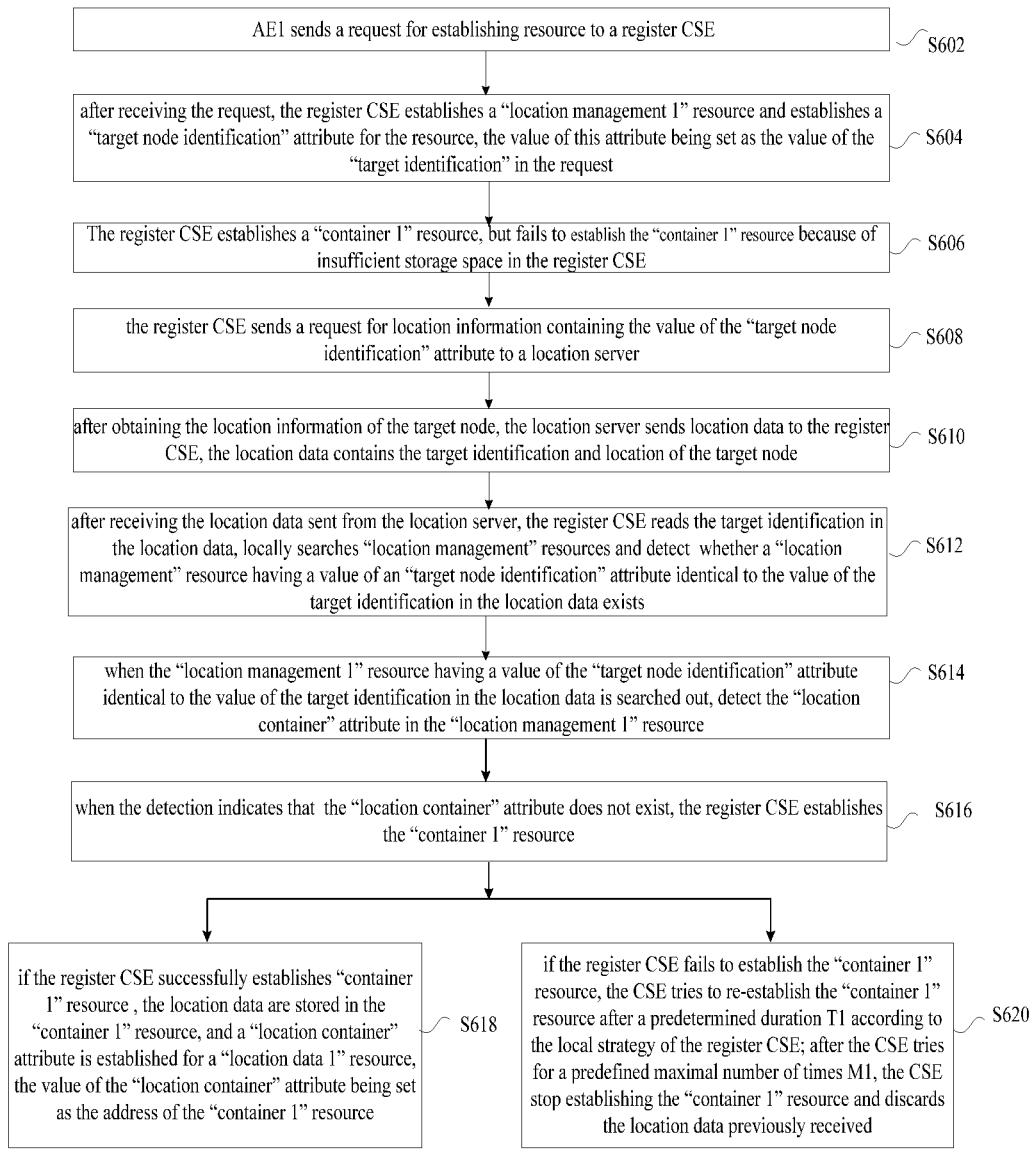
FIG. 6 is a second flowchart of a method for establishing container resource for location data according to a preferred embodiment of the present disclosure.

FIG. 6 is a second flowchart of a method for establishing container resource for location data according to a preferred embodiment of the present disclosure. The method illustrated in FIG. 6 includes steps described below.

In step S602, AE1 sends a request for establishing resource to a register CSE, the request includes: (1) resource type: location management; (2) target identification: identification of the target node whose location information needs to be obtained.

In step S604, after receiving the request, the register CSE establishes a "location management 1" resource and establishes a "target node identification" attribute for the "location management 1" resource, the value of this attribute being set as the value of the "target identification" in the request.

In step S606, the register CSE establishes a "container 1" resource, but fails to establish the "container 1" resource because of insufficient storage space in the register CSE.

In step S608, the register CSE sends a request for location information containing the value of the "target node identification" attribute to a location server.

In step S610, after obtaining the location information of the target node, the location server sends the location data to the register CSE. The location data contains the target identification and location of the target node (e.g., longitude, latitude).

In step S612, after the register CSE receives the location data sent from the location server, the register CSE reads the target identification in the location data, locally searches "location management" resources and detects whether a "location management" resource having a value of an "target node identification" attribute identical to the value of the target identification in the location data exists.

In step S614, when the "location management 1" resource having a value of the "target node identification" attribute identical to the value of the target identification in the location data is searched out, the "location container" attribute in the "location management 1" resource is detected.

In step S616, when the detection indicates that the "location container" attribute does not exist, the register CSE establishes the "container 1" resource.

In step S618, if the register CSE successfully establishes "container 1" resource, the location data are stored in the "container 1" resource, and a "location container" attribute is established for a "location data 1" resource, the value of the "location container" attribute being set as the address of the "container 1" resource.

In step S620, if the register CSE fails to establish the "container 1" resource, the CSE tries to re-establish the "container 1" resource after a predetermined duration T1 according to the local strategy of the register CSE; after the CSE tries for a predefined maximal number of times M1, the CSE stop establishing the "container 1" resource and discards the location data previously received.

In the preferred embodiment, after the container resource fails to be established, a timer may be set. When the timer times out, the CSE tries to re-establish the container resource.

In the preferred embodiment, a detection step is added when the location data is received so as to ensure the fluency of positioning procedure. Otherwise, if the location server sends the location data to the register CSE which has no specific space for storing the location data, the register CSE sends a failure response to the location server, thereby terminating the positioning process. Since all of these processes are interactions between the register CSE and the location server, the initiator of the request for positioning is unaware of these processes, thus leading to unreasonable positioning experience.

In the preferred embodiment, the definition of the behavior of the register CSE avoids accidental termination of positioning process and does not increase any additional signaling to the initiator of positioning, increasing processing capability of the register CSE and improving the user experience of the initiator of positioning.

With the embodiments described above, those skilled in the art can clearly recognize that the method according to the above embodiments may be implemented in software in combination with a necessary universal hardware platform, and may be implemented in hardware. In most cases, the former is a preferred implementation. Based on this understanding, the technical solution of the present disclosure may be, essentially or in the part contributing to the prior art, implemented in the form of a software product. The computer software product is stored in a storage medium (e.g., ROM/RAM, disc, CD-ROM) and includes instructions for enabling a terminal apparatus (which may be a mobile phone, computer, server or network apparatus, etc.) to implement the method according to embodiments of the present disclosure.

The embodiment of the present disclosure further provides a storage medium. Optionally, in the embodiment, the above storage medium may be configured to store the program codes for implementing the above method.

Optionally, in this embodiment, the above storage medium may include, but not limited to, various medium for storing program codes such as USB flash disk, Read Only Memory (ROM), Random Access Memory (RAM), mobile hard disk, disc or CD-ROM, etc.

Optionally, in this embodiment, a processor implements the method of the above embodiments based on the program codes stored in the storage medium.

Apparently, those skilled in the art should understand that various modules or steps of the present disclosure described above may be implemented by means of universal computing devices. These modules or steps may be integrated in a single computing device or distributed among a network consisting of multiple computing devices. Optionally, these modules or steps may be implemented by program codes executable by a computing device, and thus the program codes may be stored in a storage device and executed by the computing device. In some cases, the illustrated or described steps may be performed in an order different from that described herein; these modules or steps may be implemented by respective integrated circuit modules, or some of them may be implemented by a single integrated circuit module. The present disclosure is not limited to any specific combination of hardware and software.

The above description is merely preferred embodiments of the present disclosure and not to limit the present disclosure. For those skilled in the art, the present disclosure may have various modifications and alterations. All of the modifications, equivalents and improvements and the like within the spirit and principle of the present disclosure should fall within the scope of the present disclosure.

INDUSTRIAL APPLICABILITY

Based on above technical solution provided in embodiments of the present disclosure, after the CSE detects that a container resource of a location management resource corresponding to received location data fails to be established, the CSE re-establishes the container resource corresponding to the location data, which solves the problem that the location data often fails to be storage in a register CSE, and improves the fluency of user positioning.

What is claimed is:

1. A location data processing method, comprising:
   determining that a Common Service Entity (CSE) conforms to a preset establishment strategy, wherein determining that the CSE conforms to the preset establishment strategy comprises
   counting time from a last failure of the CSE in establishing a container resource, and determining that the counted time reaches a preset duration;
   determining that location data sent from a location server is received by the CSE; and
   determining that a number of times that the CSE establishes the container resource within a preset statistic period reaches a preset number of establishment times; and
   after determining, by the CSE, that the container resource of a location management resource corresponding to received location data failed to be established, re-establishing, by the CSE, the container resource corresponding to the received location data in response to determining that the CSE conforms to the preset establishment strategy.

2. The method according to claim 1, wherein the determining, by the CSE, that the container resource of the location management resource corresponding to the received location data failed to be established comprises at least one of:
   detecting an absence of a location container attribute in the location management resource; or
   detecting a null value of the container resource for the location container attribute.

3. The method according to claim 1, wherein re-establishing the container resource comprises at least one of:
   establishing the container resource, establishing a location container attribute in the location management resource, and setting a value of the location container attribute as an address of the container resource; or
   establishing the container resource, and setting a value of the location container attribute as an address of the container resource.

4. The method according to claim 1, wherein the method further comprises:
   discarding the location data in response to determining that the CSE does not conform to the preset establishment strategy.

5. A location data processing apparatus, applied in a Common Service Entity (CSE), comprising a processor configured to:
   determine that the CSE conforms to a preset establishment strategy, wherein determining that the CSE conforms to a preset establishment strategy comprises
   counting time from a last failure in establishing a container resource and determine that the counted time reaches a preset duration;
   determining that location data sent from a location server is received; and determining that a number of times of establishing the container resource within a preset statistic period reaches a preset number of establishment times;

determine that the container resource of a location management resource corresponding to received location data failed to be established; and re-establish the container resource corresponding to the location data in response to determining that the container resource failed to be established and the CSE conforms to the preset establishment strategy.

6. The location data processing apparatus according to claim 5, wherein the processor is configured to determine that the container resource of the location management resource corresponding to the received location data failed to be established comprises by at least one of:

detection of an absence of a location container attribute in the location management resource; or detection of a null value of the container resource for the location container attribute.

7. The location data processing apparatus according to claim 5, wherein the processor is further configured to re-establish the container resource by at least one of:

establishing the container resource, establishing a location container attribute in the location management resource and setting a value of the location container attribute as an address of the container resource; or establishing the container resource and setting the value of the location container attribute as the address of the container resource.

8. The location data processing apparatus according to claim 5, wherein the processor is further configured to:

discard the location data when the CSE does not conform to the preset establishment strategy.

9. A location data processing system, comprising a Common Service Entity (CSE) and a location server, wherein:

the CSE is configured to receive location data sent from the location server;

the CSE is configured to determine that the CSE conforms to a preset establishment strategy, wherein determining that the CSE conforms to a preset establishment strategy comprises counting time from a last failure in establishing a container resource and determine that the counted time reaches a preset duration;

determining that the location data sent from a location server is received; and determining that a number of times of establishing the container resource within a preset statistic period reaches a preset number of establishment times;

the CSE is further configured to determine that the container resource of a location management resource corresponding to the location data failed to be established; and the CSE is further configured to re-establish the container resource corresponding to the location data in response to determining that the container resource failed to be established and the CSE conforms to the preset establishment strategy.

10. The system according to claim 9, wherein the CSE is further configured to:

discard the location data in response to determining that the CSE does not conform to the preset establishment strategy.

11. A non-transitory computer-readable storage medium storing computer-executable instructions that, when executed by a processor, cause the processor to execute the method according to claim 1.

* * * * *